United States Patent Office 3,484,684
Patented Dec. 16, 1969

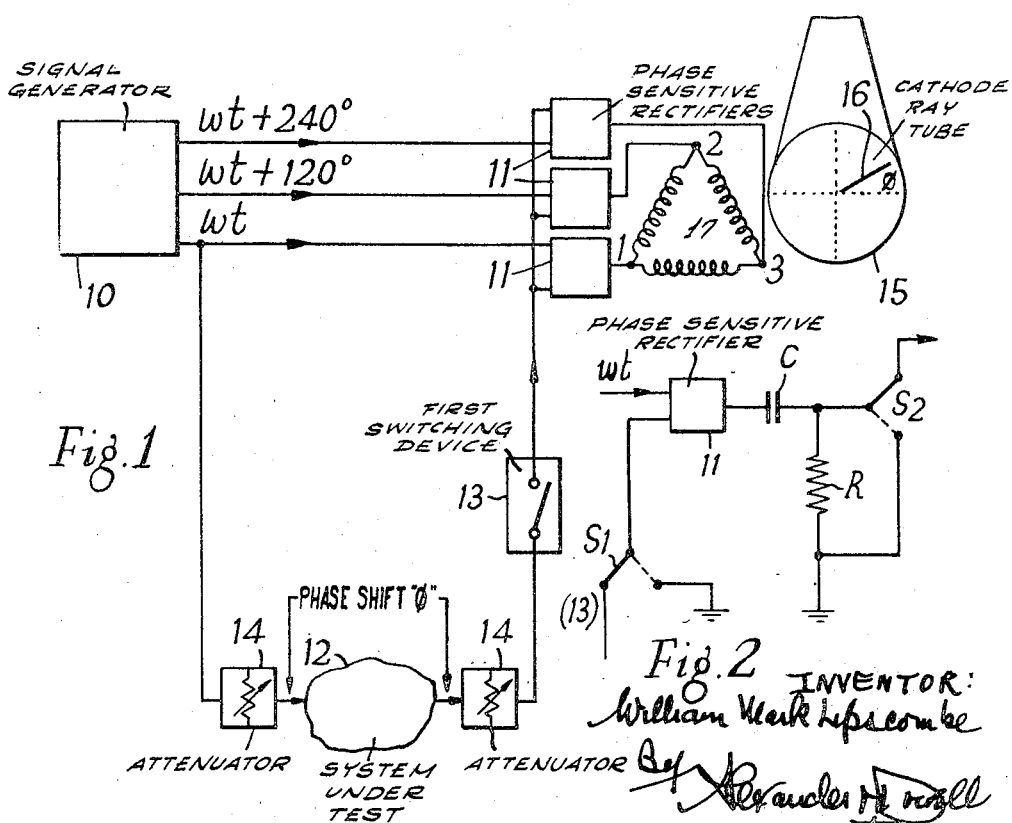

3,484,684
APPARATUS FOR DETERMINING CIRCUIT TRANSFER CHARACTERISTICS EMPLOYING THREE PHASE DISPLACED SIGNALS AND THREE PHASE SENSITIVE RECTIFIERS APPLIED TO CRT DEFLECTORS
William Mark Lipscombe, Crowborough, England, assignor to Feedback Limited, Crowborough, Sussex, England
Filed Nov. 2, 1967, Ser. No. 680,169
Int. Cl. G01r *27/00, 25/00*
U.S. Cl. 324—57       5 Claims

ABSTRACT OF THE DISCLOSURE

An electrical apparatus is provided to indicate on a cathode ray tube a trace from which gain or attenuation and phase displacement are determined. The apparatus is provided with a signal generator from which three mutually phase displaced signals are obtained, and three phase sensitive rectifiers. The three rectifiers are connected to the inputs of the cathode ray tube deflectors. The phase sensitive rectifiers are commonly connected to one signal by way of a switch and the electrical circuit under test. When the switch is alternately made and broken a vector is traced on the cathode ray tube.

Background of the invention

The present invention relates to an apparatus for determining the transfer characteristics of an electrical system i.e. for measuring the gain or attenuation and phase displacement of a signal through the system to be tested.

An object of the invention is to provide an apparatus which allows the values of gain and phase displacement to be easily determined by means of a readily readable indication.

Summary of the invention

According to the invention there is provided an apparatus for determining the transfer characteristic of an electrical system, said apparatus comprising:

(a) a signal generator providing three electrical A.C. signals from separate outputs, the signals mutually phase displaced by 120°, (b) three phase sensitive rectifiers for receiving said three A.C. signals respectively, (c) a switching device connected to the control input of one of said signals each phase sensitive rectifier for alternately connecting and disconnecting a signal from the electrical system under test, which system is connected to receive an input from one of the outputs of said signal generator, and (d) a cathode ray tube having deflection circuitry in the form of a delta-connected three phase winding having junction points each connected to the output of one of the phase sensitive rectifiers, whereby, when the output from the signal under test is alternately connected to and disconnected from the control inputs of the phase sensitive rectifiers by means of the switching device, the deflection winding of the cathode ray tube is energised by the output signals of the phase sensitive rectifier and the beam is deflected to trace on the screen a vector being indicative of the transfer characteristic of the electrical system under test.

By providing an apparatus having these features the value of phase displacement and gain or attenuation can be read directly off the cathode ray by means of the vector.

Brief description of drawing

Constructional embodiments of the present invention will now be described, by way of example, with reference to the accompanying drawing wherein:

FIGURE 1 is a schematic block diagram of an apparatus for measuring gain and phase displacement in relation to a three phase signal, and FIGURE 2 shows a modification of the phase sensitive rectifier in each circuit of these shown in the arrangement of FIGURE 1.

Description of preferred embodiments

The apparatus shown in FIGURE 1 comprises a signal generator 10 which supplies three electrical A.C. signals $wt$, $wt+120°$, and $wt+240°$, mutually phase displaced by 120°, to three phase sensitive rectifiers 11. The outputs of the rectifiers 11 are connected to junctions 1, 2 and 3 of a delta connected three-phase deflection winding 17 of a cathode ray tube 15.

One of the signals $wt$ is fed via a system 12 under test and a switching device 13 to the control circuits of the phase sensitive rectifiers 11. The switching device 13 is in the form of a low frequency chopper; variable attenuators 14 are preferably provided at the input and output of the system 12.

The shift "$\phi$" in the signal $wt$ due to the system 12 causes the output voltages of phase sensitive rectifiers 11 to change thereby effecting a shift in the spot of the cathode ray tube 15. Since the control inputs to the rectifiers 11 are alternately switched on and off by the device 13 the CRT spot traces a vector 16 on the screen of the tube 15.

The direction of the vector represents the phase shift of the system 12 and the length of the vector represents the relative gain of the system 12. The vector may be measured off the face of the CRT, with reference to a cartesian or polar graticule. Alternatively the relative gain of the system 12 may be measured by adjusting the output or input attenuator 14 to give a standard vector length.

As shown in FIGURE 2 the phase sensitive rectifiers in each case may have a modified circuit.

The phase sensitive rectifier has a frequency response extending to zero and if its output were connected directly to the cathode ray tube this could result in drift of the display. The switch S1 corresponds to the switch 13 in the circuit shown in FIGURE 1 and is periodically operated to form the desired vector display. The switch S2 is operated synchronously with switch S1 and connects the junction of the capacitors C and resistor R periodically to ground thus ensuring a fixed starting point or origin for the vector display independent of zero drift in the preceding circuits. When S1 and S2 connect to the input and output lines respectively the change of output from the phase sensitive rectifier is transmitted via capacitors and resistor to the cathode ray tube deflection circuits.

I claim:

1. An apparatus for determining the transfer characteristic of an electrical system, said apparatus comprising:

(a) a signal generator providing three electrical A.C. signals from separate outputs, the signals mutually phase displaced by 120°, (b) three phase sensitive rectifiers for receiving said three A.C. signals respectively as control inputs, (c) a switching device connected to the input of each phase sensitive rectifier for alternately connecting and disconnecting a signal from the electrical system under test, which system is connected to receive an input from one of the outputs of said signal generator, and (d) a cathode ray tube having deflection circuitry in the form of a delta-connected three phase winding having junction points each connected to the output of one of the phase sensitive rectifiers, whereby, when the output from the signal under test is alternately connected to and disconnected from the control inputs of the phase sensitive rectifiers by means of the switching device, the deflection winding of the cathode ray tube is energized by the output signals of the phase sensitive rectifier and the beam is deflected to trace on the screen a vector being indicative of the transfer characteristic of the electrical system under test.

2. An apparatus as claimed in claim 1, wherein each phase sensitive rectifier is provided with a second switching device operated in synchronism with the first switching device, a capacitor for each second switching device connected between the second switching device and the output of its respetive phase sensitive rectifier, and a resistor connected from each capacitor-switch junction to earth, wherein the first switching device is arranged to connect the phase sensitive rectifier control inputs alternately to the A.C. system under test and to earth, and each second switching device is arranged to connect the capacitor-switch junction alternately to the deflection circuitry and earth.

3. An apparatus according to claim 1, wherein the switching device is a low frequency chopper.

4. An apparatus according to claim 1, wherein two variable attenuators are provided, one connected to the input of the system under test and the other connected to the output of the system under test.

5. An apparatus according to claim 4, wherein the gain or attenuation of the system is determined by adjusting either or both attenuators to provide a vector of a standard reference length.

References Cited

UNITED STATES PATENTS

| | | | |
|---|---|---|---|
| 2,649,570 | 8/1953 | Radcliffe | 324—57 |
| 2,751,554 | 6/1956 | Schlesinger et al. | 324—121 X |
| 2,816,266 | 10/1957 | Nadolski | 324—88 |

EDWARD E. KUBASIEWICZ, Primary Examiner

J. M. HANLEY, Assistant Examiner

U.S. Cl. X.R.

324—88